(12) United States Patent
Wills et al.

(10) Patent No.: US 10,718,631 B1
(45) Date of Patent: Jul. 21, 2020

(54) PRIMARY FLIGHT DISPLAY (PFD) WITH ADJUSTABLE TRANSLUCENCY GAUGES

(71) Applicant: Rockwell Collins, Inc., Cedar Rapids, IA (US)

(72) Inventors: Jeremy D. Wills, Marion, IA (US); Jeffrey R. Imig, Houston, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/292,228

(22) Filed: Mar. 4, 2019

(51) Int. Cl.
*G01C 23/00* (2006.01)
*B64D 43/00* (2006.01)

(52) U.S. Cl.
CPC .......... *G01C 23/005* (2013.01); *B64D 43/00* (2013.01)

(58) Field of Classification Search
CPC ..... G01C 23/005; G01C 21/00; G06F 3/0488; G06F 3/04842; G06F 2203/04804; G06F 17/00
See application file for complete search history.

(56) References Cited

U.S. PATENT DOCUMENTS

| 9,132,913 B1* | 9/2015 | Shapiro | B64C 19/00 |
| 9,262,932 B1* | 2/2016 | Barber | G08G 5/0021 |
| 2010/0023187 A1* | 1/2010 | Gannon | G01C 23/00 701/7 |

* cited by examiner

*Primary Examiner* — Toan N Pham
(74) *Attorney, Agent, or Firm* — Suiter Swantz pc llo

(57) ABSTRACT

A primary flight display (PFD) system for displaying flight information of an aircraft to a user includes a user interface configured to receive input from the user and display the flight information to the user and a processing circuit. The processing circuit is configured to cause the user interface to display one or more gauges indicating the flight information at a first translucency value over background information, receive, via the user interface, a second translucency value, and cause the user interface to display the one or more gauges indicating the flight information at the second translucency value over the background information.

22 Claims, 8 Drawing Sheets

(5 of 8 Drawing Sheet(s) Filed in Color)

PRIMARY FLIGHT DISPLAY (PFD) WITH ADJUSTABLE TRANSLUCENCY GAUGES

BACKGROUND

Embodiments of the inventive concepts disclosed herein relate generally to the field of primary flight display (PFD) systems for aircraft. More particularly, embodiments of the inventive concepts disclosed herein relate to flight gauges of flight display systems.

In some PFD systems, multiple different forms of information are displayed to a pilot. Some of the information includes parameters such as airspeed, altitude, and/or heading. This information may be displayed via gauges, e.g., flight tape gauges. Additional information, e.g., situational information, mission information, etc. can also be displayed to a pilot via the PFD system. However, if the flight tape gauges are displayed on top of the additional information, the flight gauges may block the additional information making it difficult for a pilot to quickly and easily review information on the PFD.

SUMMARY

In one aspect, the inventive concepts disclosed herein are directed to a primary flight display (PFD) system for displaying flight information of an aircraft to a user. The PFD system includes a user interface configured to receive input from the user and display the flight information to the user and a processing circuit. The processing circuit is configured to cause the user interface to display one or more gauges indicating the flight information at a first translucency value over background information, receive, via the user interface, a second translucency value, and cause the user interface to display the one or more gauges indicating the flight information at the second translucency value over the background information.

In a further aspect, the inventive concepts disclosed herein are directed to a method of adjusting a translucency of one or more gauges of a primary flight display (PFD). The method includes causing, by a processing circuit, a user interface to display the one or more gauges indicating flight information of an aircraft at a first translucency value over background information, receiving, by the processing circuit via the user interface, a second translucency value, and causing, by the processing circuit, the user interface to display the one or more gauges indicating the flight information at the second translucency value over the background information.

In a further aspect, the inventive concepts disclosed herein are directed to a system for displaying flight information of an aircraft to a user, the system includes one or more memory devices configured to store instructions thereon, that, when executed by one or more processors, cause the one or more processors to cause a user interface to display one or more gauges indicating the flight information at a first translucency value over background information, cause the user interface to display a selection element, receive, via the user interface, a second translucency value by receiving one or more interactions by the user with the selection element, and cause the user interface to display the one or more gauges indicating the flight information at the second translucency value over the background information.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
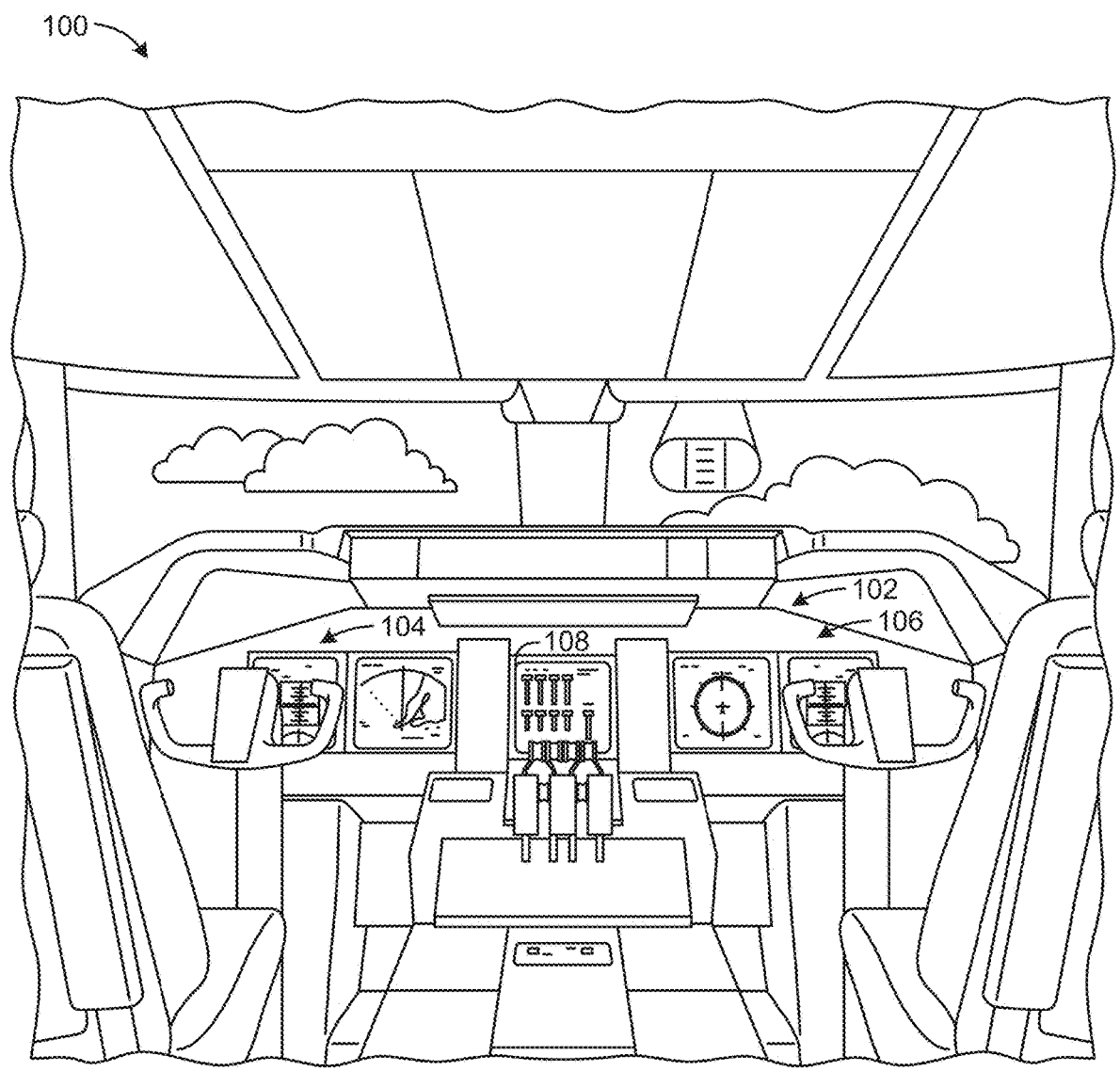
FIG. 1 is an illustration of a primary flight display (PFD) system in a cockpit of an aircraft according to exemplary aspects of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the FIGURES, systems and methods for a primary flight display (PFD) with adjustable translucency virtual tape gauges are described with respect to various aspects of the inventive concepts. In some embodiments, a PFD system can incorporate synthetic vision images layered behind virtual tape gauges (e.g., airspeed gauges, altitude gauges, heading gauges, etc.). The synthetic vision images can provide significant situational awareness to crew of an aircraft beyond the information communicated to the crew by the virtual tape gauges. However, depending on how opaque or translucent the gauges are, portions of the synthetic images can be obscured.

In some embodiments, the PFD system includes a non-configurable translucency parameter for the gauges that is set during design or construction of the PFD system. This translucency parameter of the gauges may not be modifiable once the PFD system is deployed to the field. A PFD system may include additional flight information such as terrain, obstacles, airports, and/or further tactical information e.g., tactical data link targets, threat domes, and/or complex sensor imagery via the synthetic vision images that may be important to a mission. Furthermore, the tactical information may include symbols such as targeting information. The additional flight information and/or tactical information may compete with the gauges on display screens of the PFD system, i.e., some of the information, for examples the gauges, may add clutter in certain flight situations.

In some embodiments, the PFD system is configured to generate avionics interfaces for a pilot which include the ability for the pilot to adjust the translucency of the primary flight gauges during operation. This allows the pilot to adjust visibility of the symbology critical to the current situation, i.e., emphasizing either the PFD gauges or the background tactical symbols. In some embodiments, the PFD system is configured to receive pilot input to adjust translucency of the PFD gauges between fully opaque and fully translucent (or within any other range of translucency values). When gauges are fully translucent the digital readout of the parameter may still be displayed so the data will still be available to the pilot.

In some cases, the translucency of the PFD gauges may be time critical depending on the situation. Therefore, a control mechanism to generate, display, and manage translucency of gauges by the PFD system can allow the pilot to quickly and accurately change the translucency value. In some cases, the PFD system allows a pilot to make time critical adjustments to the translucency of the PFD gauges. The PFD system is configured to provide an interface element for selecting between a predefined number of discrete translucency states using a sequential rotary gesture, in some embodiments. In some embodiments, the interface element facilitates the selection of a predefined number (e.g., six discrete detents) for improved PFD gauge configurability and speed.

In some embodiments, the selection element is implemented as multi-finger touch screen rotational gesture on the region of the display including the PFD format. In some embodiments, the PFD system is configured to select a transparency level for the PFD gauges based on a physical rotary knob of the PFD system. In some cases, when the PFD system does not include a touchscreen, the PFD system may utilize the rotary knob. In some embodiments, the PFD system utilizes both the touch selection and physical interface together. The rotary touch gesture may allow accurate selection between detents in conditions where turbulence could cause the hand to move laterally or vertically on the display surface. The PFD system, via the touch interface, can be configured to ignore strait line movement and instead only recognize rotational movement to select between the states. In some embodiments, the PFD system can be configured to utilize a slider to select the translucency value for the PFD gauges. However, control gestures such as a slider may be more susceptible to turbulent movements.

For mission aircraft, it may be advantageous, depending on the flight segment and pilot flying position (e.g., a pilot, copilot, pilot flying, crew member or pilot not flying, etc.), to be able to adjust the translucency of the PFD tapes during operation. For example, during instrument flight rules (IFR) landing, the pilot flying could cause the display to display gauges at full opacity to aid instrument scan. During a tactical engagement, the pilot not flying could set the gauges to full translucency to focus on other indications.

Referring now to FIG. 1, a cockpit 100 is shown with a PFD system 102, according to an exemplary embodiment. The cockpit 100 can be a local or remote cockpit for a commercial aircraft, military aircraft, helicopter, unmanned aerial vehicle (UAV), spacecraft, and/or any other kind of vehicle, manned or unmanned. The PFD system 102 includes display screens 104 and 106 for two pilots although the PFD system 102 may include any number, e.g., one or more, display screens. The display screens 104 and/or 106 can be touch screens or non-touch screens, in some embodiments. The display screens 104 and/or 106 are configured to display the interfaces of FIGS. 4-12, in some embodiments.

The display screens 104 and/or 106 may be any cathode ray tube (CRT), light-emitting diode display (LED), electroluminescent display (ELD), plasma display panel (PDP), liquid crystal display (LCD), organic light-emitting diode display (OLED), holographic display, and/or any other type of display screen. In some embodiments, the display screens 104 and/or 106 are combined with physical interface 108 e.g., a display screen surrounded by, or associated with physical input devices (e.g., buttons). In some embodiments, the display screens 104 and/or 106 are combined with the physical interface 108 as a touch screen interface. The display screens 104 and/or 106 may be a resistive touch screen interface, a single-capacitive display screen, and/or a multi-capacitive display screen. The display screens 104 and/or 106 may include any type of input and/or output configured to receive input from a pilot and visually display output to the pilot.

The physical interface 108 may be or include one or more buttons, knobs, switches, keypads, and/or any other instrument that can be used to generate an input for the PFD system 102. The physical interface 108 may include a cursor control input (e.g., a mouse, a trackball, or a trackpad), dedicated control inputs (e.g., one or more dedicated control knobs or one or more dedicated buttons), non-dedicated control inputs (e.g., a tabber knob, a selection mechanism, or a button), and/or typed entry fields (e.g., a keyboard).

Figure 2:
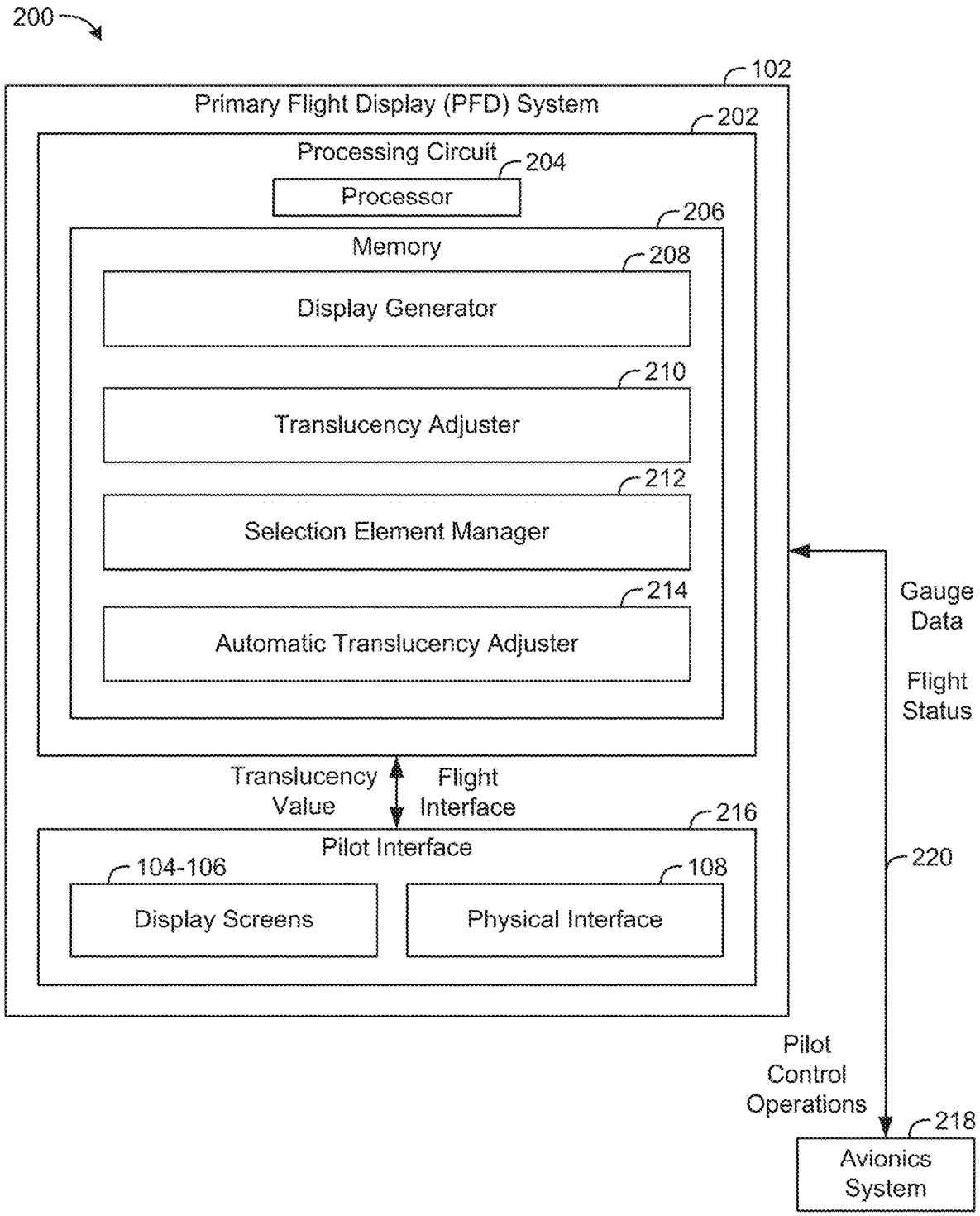
FIG. 2 is a block diagram of the PFD system of FIG. 1 configured to adjust translucency of displayed gauges according to exemplary aspects of the inventive concepts disclosed herein.

Referring now to FIG. 2, a system 200 including the PFD system 102 and an avionics system 218 is shown, according to an exemplary embodiment. The PFD system 102 is configured to generate flight display interfaces, e.g., the interfaces shown in FIGS. 4-12 and is configured to adjust the translucency of gauges of the flight display interfaces. The PFD system 102 is configured to generate a selection element and receive a translucency value for the gauges via user interactions with the selection element, in some embodiments. Furthermore, the PFD system 102 is configured to implement translucency schedules and/or rules for automatically adjusting translucency values for the gauges, in some embodiments.

The PFD system 102 includes a processing circuit 202 and a pilot interface 216. The pilot interface 216 includes the display screens 104-106 and the physical interface 108 as described with reference to FIG. 1. The processing circuit 202 include the processor 204 and the memory 206. The processing circuit 202 may include at least one processor 204, which may be any type of general purpose or special purpose processor (e.g., FPGA, CPLD, ASIC). The processing circuit 202 also includes at least one memory 206, which may be any type of non-transitory computer or machine-readable storage medium (e.g., ROM, RAM, hard disk, flash memory).

The system 200 includes an avionics system 218. The PFD system 102 is configured to communicate with the avionics system 218 and receive flight data from the avionics system 218 and provide pilot control operations to the avionics system 218. The PFD system 102 can communicate with the avionics system 218 via the connection 220 which may be any electrical connection, physical cable(s), and/or wireless connection, and/or network. The PFD system 102 and the avionics system 218 can be configured to communicate via ARINC communication protocols, a local area network (LAN), serial cables, RS-485, RS-232, Ethernet cables, etc. In some embodiments, the avionics system 218 is a flight management system (FMS) configured to communicate flight information (e.g., waypoint name data, waypoint altitude data, desired track, time to go, distance to go, etc.) to the PFD system 102. For example, the flight information could be a destination (e.g., a particular city, coordinate, etc.) and related information regarding the altitude or location of the destination and the length of time and/or distance from the aircraft to the destination.

In some embodiments, the avionics system 218 and the PFD system 102 are integrated into a single avionics system. The avionics system 218 can be one or more systems including processing equipment (e.g., similar to, or the same as the processing circuit 202) for operating an aircraft. The avionics system 218 is configured to receive gauge data for various gauges generated and/or managed by the PFD system 102, from sensors and/or other systems of the avionics system 218, e.g., for example compasses, altimeters, radar systems, etc., in some embodiments. For example, the gauge data can include terrain data, altitude data, heading data, weather data, airspeed data, vertical speed data, engine data (e.g., power output of the engine (NG), torque, temperature, etc.), wind speed, wind velocity, etc. The data may also include flight status information. For example, various flight statuses may indicate that an aircraft is taking off, landing, on auto pilot, engaging in a tactical mission, etc. The PFD system 102 is configured, in some embodiments, to generate gauges and/or background information for display by the display screens 104-106 based on the gauge data and/or flight status information received from the avionics system 218.

In some embodiments, the PFD system 102 receives pilot operations via the display screens 104-106 and/or the physical interface 108. The operations may be to control the flight of the aircraft, e.g., cause the aircraft to change altitude, heading, etc. Furthermore, the operations may be status indications, e.g., to enter a landing mode, to engage landing gear, etc. The PFD system 102 can receive the commands via the pilot interface 216 from a pilot.

The memory 206 includes a display generator 208, a translucency adjuster 210, a selection element manager 210, and an automatic translucency adjuster 214. The display generator 208 can be configured to generate interfaces for display on the display screens 104-106. The display generator 208 is configured, in some embodiments, to generate the interfaces based on the gauge data and/or flight status received from the avionics system 218. In some embodiments, the interfaces generated by the display generator 208 are the interfaces of FIGS. 4-12.

In some embodiments, the display generator 208 generates the interfaces by causing the interfaces to include current flight information received from the avionics system 218, for example, cause a heading gauge to display a current heading information, cause an altitude gauge to display current altitude information, etc. Furthermore, in some embodiments, the display generator 208 receives tactical and/or terrain information (e.g., three dimensional terrain data) from the avionics system 218. In this regard, the display generator 208 is configured to cause the interface to include terrain (e.g., three dimensional terrain data) or tactical information as background information. In some embodiments, the display generator 208 generates the interfaces to overlay gauges (e.g., virtual tape gauges) over the background information (e.g., the terrain and/or tactical information).

In some embodiments, the display generator 208 is configured to cause information in the interface to be displayed at a particular translucency value. In this regard, the display generator 208 can be configured to cause a gauge of the interface to be displayed over background information at a particular translucency.

The translucency adjuster 210 is configured, in some embodiments, to change the translucency value used by the display generator 208 to generate the interfaces. As the translucency value is adjusted by the translucency adjuster 210, the display generator 208 can cause the gauge to be displayed according to the adjusted translucency value. The translucency value can be a parameter causing the gauge (or other display element) to adjust from fully opaque to fully translucent, or within any other range of translucency. The translucency value can be a discrete value and can be one of a set of predetermined translucency values such that the translucency value can be adjusted to any predetermined translucency value of the set. In some embodiments, the translucency value is one of a continuous set of values and can be any value according to a particular data resolution for the value. Examples of a gauge being displayed at various different translucency values that the translucency adjuster 210 can cause the translucency value to be adjusted are the interfaces of FIGS. 4-9.

The selection element manager 212 is configured to manage a selection element for receiving a translucency value for the translucency adjuster 210, in some embodiments. The selection element manager 212 can monitor a physical element, e.g., a knob, a slider, etc. of the physical interface 108. In this regard, the translucency adjuster 210 is configured to receive the translucency level from the physical interface 108 by monitoring an output of a physical component of the physical interface 108 and provide the translucency level to the translucency adjuster 210 for adjusting the translucency of an element of the interface generated by the display generator 208.

In some embodiments, the selection element manager 212 is configured to cause the display screens 104-106 to display a selection element (e.g., a graphic element that the pilot can interact with) to set a translucency value. For example, the selection element manager 212 can be configured to generate a slider, a rotation element, a virtual knob element, etc. and cause the display screens 104-106 to display the element. Based on user interaction with the virtual display element, the selection element manager 212 can determine a translucency value and provide the value to the translucency adjuster 210.

In some embodiments, the selection element manager 212 is configured to cause the display screens 104-106 to display the selection element in response to a request by a user. In some embodiments, the request includes a particular input to the display screens 104-106, e.g., double tapping on the display screens 104-106, holding a touch to the display screens 104-106 for a predefined length of time, etc. In some embodiments, the request included providing a predefined number of simultaneous touches to the display screens 104-106. For example, if a pilot touches five fingers to the display screen 104, the selection element manager 212 can cause the display screen 104 to display the selection element and receive the translucency value from the pilot. In some embodiments, while the pilot is touching the screen with all five fingers, the pilot can perform a rotation gesture (similar to twisting a door knob) to cycle through various available translucency values. The gesture can be in a clockwise or counterclockwise direction to increase or decrease the translucency value. For example, a clockwise direction may cause the gauges to become less translucence (e.g., decrease the translucency value) while a counterclockwise direction may cause the gauges to become more translucence (e.g., increase the translucency value). The selection element manager 212, and the selection element, are described in greater detail with respect to the interfaces of FIGS. 10-12.

The automatic translucency adjuster 214 can be configured to automatically select a translucency value automatically without direct user input. For example, the automatic translucency adjuster 214 can include one or more different rules identifying particular translucency values for particular gauges based on information received from the avionics system 218. For example, if an altitude of the aircraft exceeds a predefined level, the automatic translucency adjuster 214 may cause an altitude gauge to be displayed at a particular translucency value such that the pilot can easily see the altitude gauge (e.g., close to, or fully opaque).

As another example, if the flight status indicates that the aircraft has entered a tactical engagement, the automatic translucency adjuster 214 may cause gauges to be displayed at a particular translucency such that background information pertaining to the tactical engagement is not blocked by the gauges (e.g., close to, or fully translucent). The rules may further define various translucency values for takeoff, landing, and/or any other situation. In some embodiments, the pilot can preconfigure the rules by providing input to the pilot interface 216 prior to, or during, a flight. Furthermore, in some embodiments, the automatic translucency adjuster 214 is configured to generate machine learning models (e.g., neural networks, Bayesian networks, decision trees, etc.) to learn preferences of a pilot for different aircraft situations.

Figure 3:
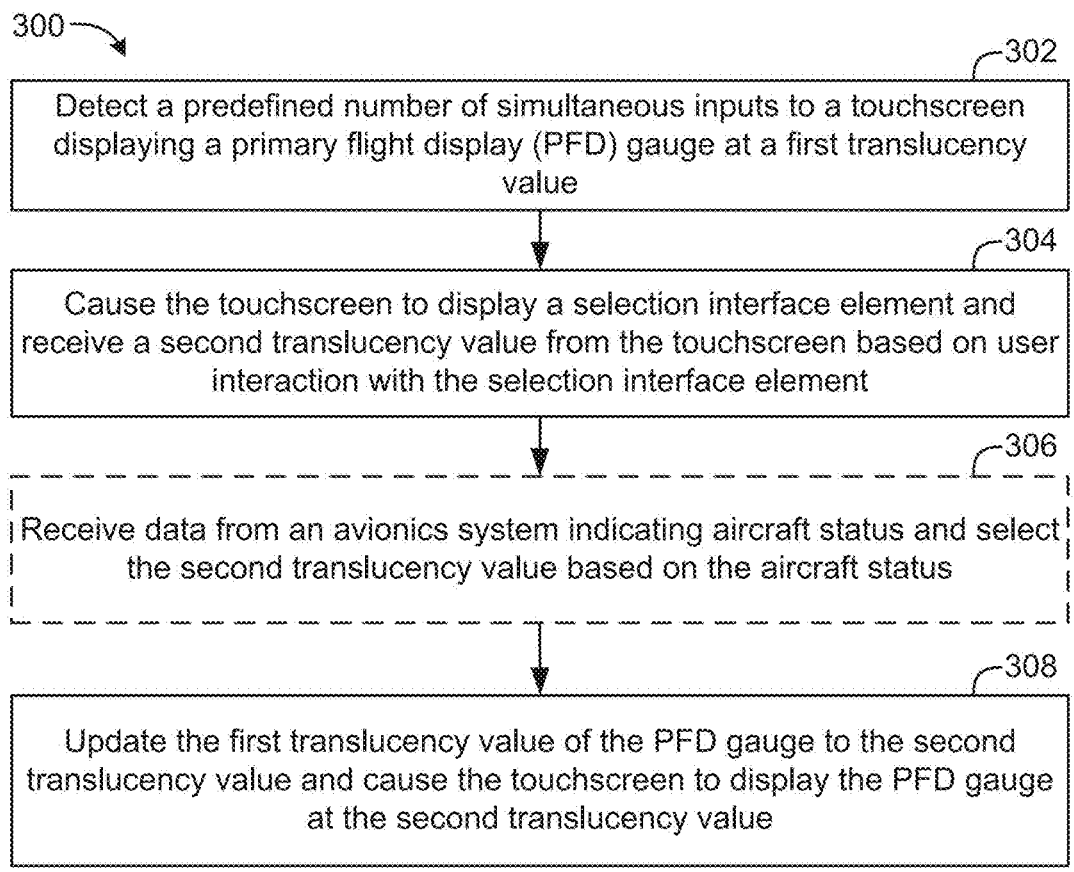
FIG. 3 is a flow diagram of a process of operating the PFD system of FIG. 2 to control the translucency of the displayed gauges according to exemplary aspects of the inventive concepts disclosed herein.

Referring now to FIG. 3, a process 300 is shown of adjusting the translucency value of gauges of a PFD interface that can be performed by the PFD system 102, according to an exemplary embodiment. In some embodiments, the PFD system 102 is configured to perform the process 300. In some embodiments, the processing circuit 202 is configured to perform the process 300. In some embodiments, the avionics system 218 is configured to perform the process 300. Any type of computing system can be configured to perform the process 300.

In step 302, the selection element manager 212 detects a predefined number of simultaneous touch inputs to a touchscreen. For example, a pilot may press a predefined number of fingers against the display screen 104 (a touchscreen) indicating that the pilot wishes to change the translucency of gauges displayed on the display screen 104. In some embodiments, the number of simultaneous touch inputs is five but may be any number of simultaneous touch inputs. The gauges that the pilot wishes to adjust may be displayed at a first particular translucency value that the pilot wishes to change to a second translucency value.

In step 304, the selection element manager 212 can cause the touchscreen to display a selection interface element and receive the second translucency value from the touch screen based on user interaction with the selection interface element. For example, the selection element manager 212 can cause the display screen 104 to display a selection interface element, e.g., one of the rotational elements of FIGS. 10-12. A user can provide an input (while still applying the predefined number of simultaneous inputs to the display screen 104) to select the second translucency value. For example, the user may rotate their hand in a clockwise or counterclockwise direction to change the translucency value for the gauges from the first value to the second value.

In step 306 the automatic translucency adjuster 214 can receive data from an avionics system and select the second translucency value based on the aircraft status. Step 306 is shown in dashed lines as the step 306 may or may not occur, i.e., the automatic translucency adjuster 214 may be turned on or off by a pilot and/or may or may not be included in the process 300. In some embodiments, the automatic translucency adjuster 214 receives flight status data and/or gauge data from the avionics system 218 and applies one or a set of rules on the data to determine the second translucency value. For example, one of the rules may indicate that a particular translucency value should be applied in response to a tactical engagement being entered. In this regard, if the flight status information indicates such an engagement, the automatic translucency adjuster 214 can select the second translucency value according to the rule (e.g., the rule may indicate a predefined value).

In step 308 the translucency adjuster 210 updates the first translucency value of the PFD gauge to the second translucency value. In some embodiments, the translucency adjuster 210 receives the second translucency value from the selection element manager 212 and causes a current translucency value of the PFD gauge to be updated to the second value. The display generator 208 can implement the adjustment by causing the PFD gauge to be displayed at the second translucency value.

Referring now to FIGS. 4-9, interfaces 400-900 that the display generator 208 can generate and cause the display screens 104-106 to display are shown, according to exemplary embodiments. Interfaces 400-900 illustrate gauges being displayed from "fully opaque" to "fully transparent." The "fully opaque" and "fully transparent" interfaces may correspond to the ends of the range of possible values for the translucency values and not necessary to actual full opacity and full transparency. However, in some embodiments, the ends of the range of possible translucency values may be full opacity and full transparency. Interface 700 may be a "nominal transparency," a middle transparency value. Each of the interfaces 400-900 may correspond to the gauges being displayed at different translucency values.

Figure 4:
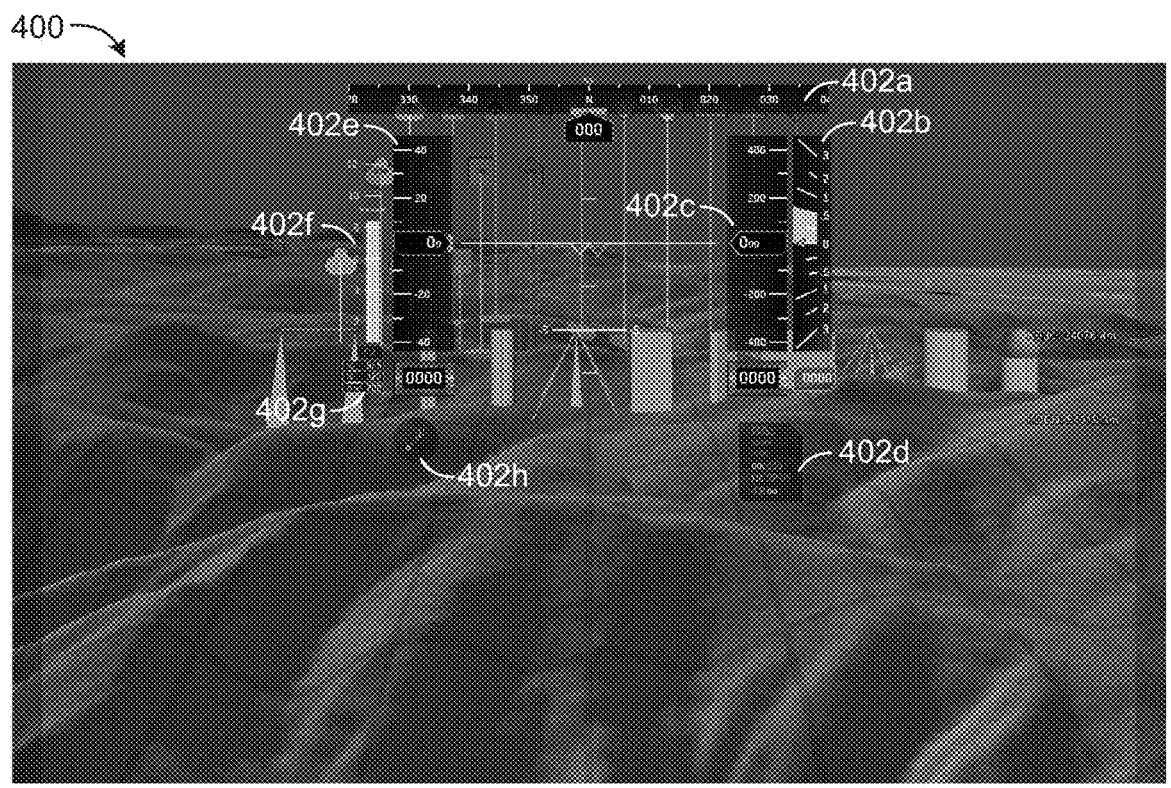
FIG. 4 is an interface generated by the PFD system of FIG. 2 with virtual tape gauges displayed at a first translucency value over background information according to exemplary aspects of the inventive concepts disclosed herein.
Figure 5:
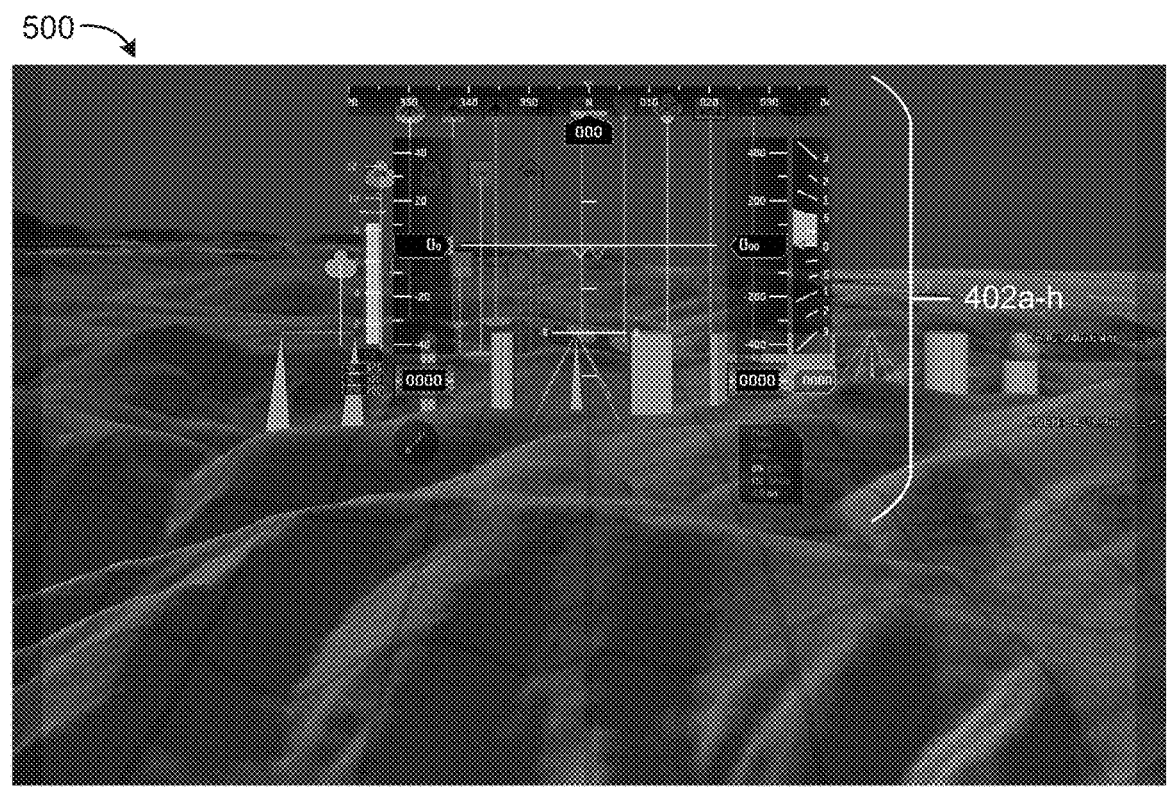
FIG. 5 is an interface generated by the PFD system of FIG. 2 with the virtual tape gauges displayed at a second translucency value over the background information according to exemplary aspects of the inventive concepts disclosed herein.
Figure 6:
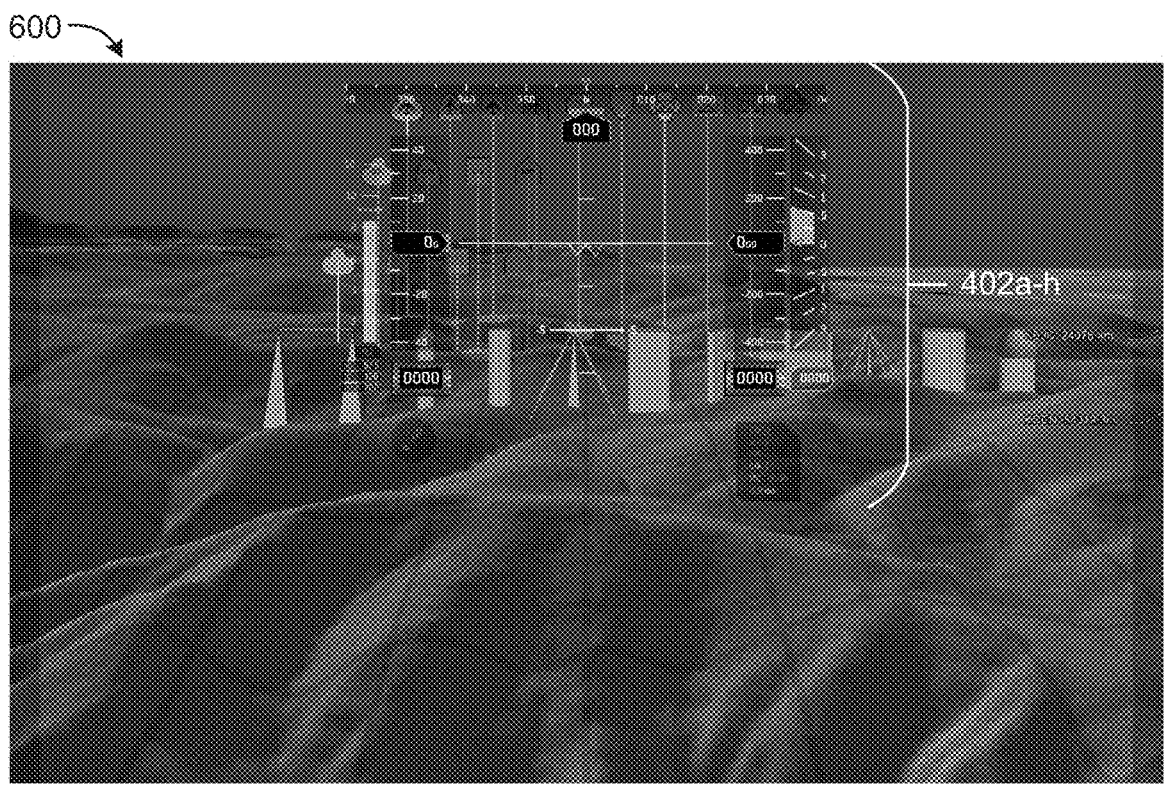
FIG. 6 is an interface generated by the PFD system of FIG. 2 with the virtual tape gauges displayed at a third translucency value over the background information according to exemplary aspects of the inventive concepts disclosed herein.
Figure 7:
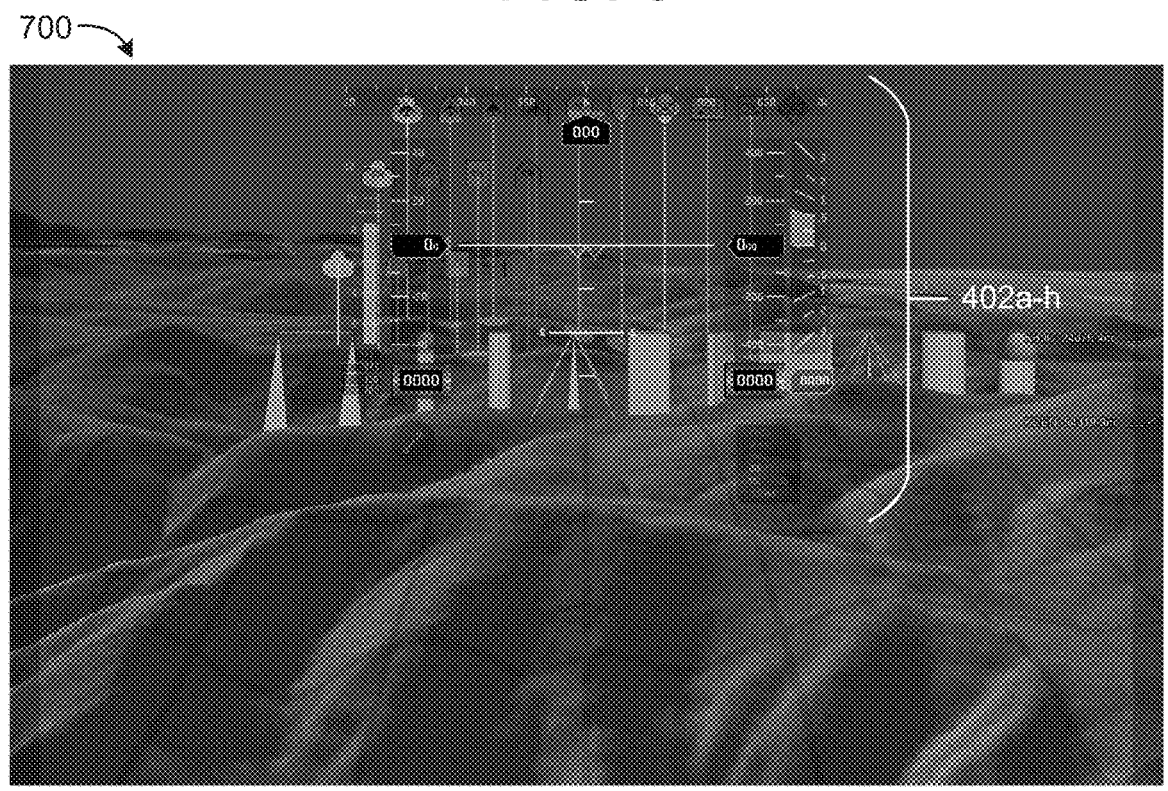
FIG. 7 is an interface generated by the PFD system of FIG. 2 with the virtual tape gauges displayed at a fourth translucency value over the background information according to exemplary aspects of the inventive concepts disclosed herein.
Figure 8:
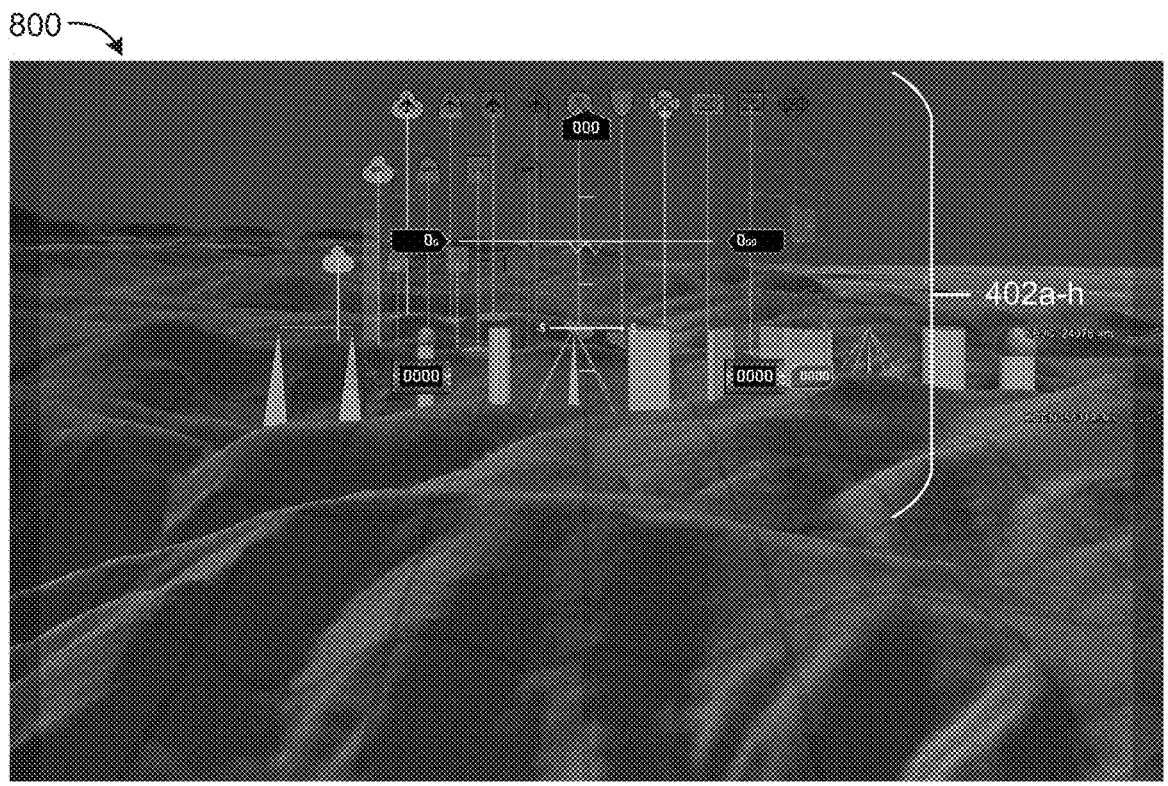
FIG. 8 is an interface generated by the PFD system of FIG. 2 with the virtual tape gauges displayed at a fifth translucency value over the background information according to exemplary aspects of the inventive concepts disclosed herein.

Referring now to FIG. 4, the interface 400 is shown including gauges 400a-400d displayed at a particular translucency value, according to an exemplary embodiment. The gauges 400a-400d can be generated by the display generator 208 based on gauge data received from the avionics system 218, i.e., the gauges 400a-400d may display the gauge data received from the avionics system 218. The gauges 400a-400d can be virtual tape gauges, i.e., tape gauges (e.g., vertical or horizontal tape gauges) digitally generated and displayed by the display generator 208 within the interface 400. The gauge 402a may be a heading gauge displaying heading information of an aircraft. The heading may be degrees from north.

The gauge 402b may be a gauge representing vertical speed of the aircraft (e.g., how fast the aircraft is changing altitude), the gauge 402c may represent altitude of the aircraft, the gauge 402d may be a readout including parameters related to a Flight Management System (FMS) next navigation waypoint. The parameters may be navigation source (e.g., FMS1), a waypoint name (e.g., YAMMI), waypoint altitude (e.g., 3000 feet), desired track (DTK) (e.g., 335 degrees), time to go (TTG) (e.g., 2:05 2 minutes 5 seconds), and/or distance to go (4.8 nautical miles (NM)), gauge 402e may represent airspeed of the aircraft (how fast the aircraft is moving forward), gauge 402f may be an engine gauge (e.g., a graphical representation of normalized power output of an engine of the aircraft), gauge 402g may be a digital readout of engine parameters (e.g., power output of the engine (NG), torque and temperature, etc.), gauge 402h may represent an indication of wind direction and/or velocity, e.g., a headwind encountered by the aircraft.

Figure 9:
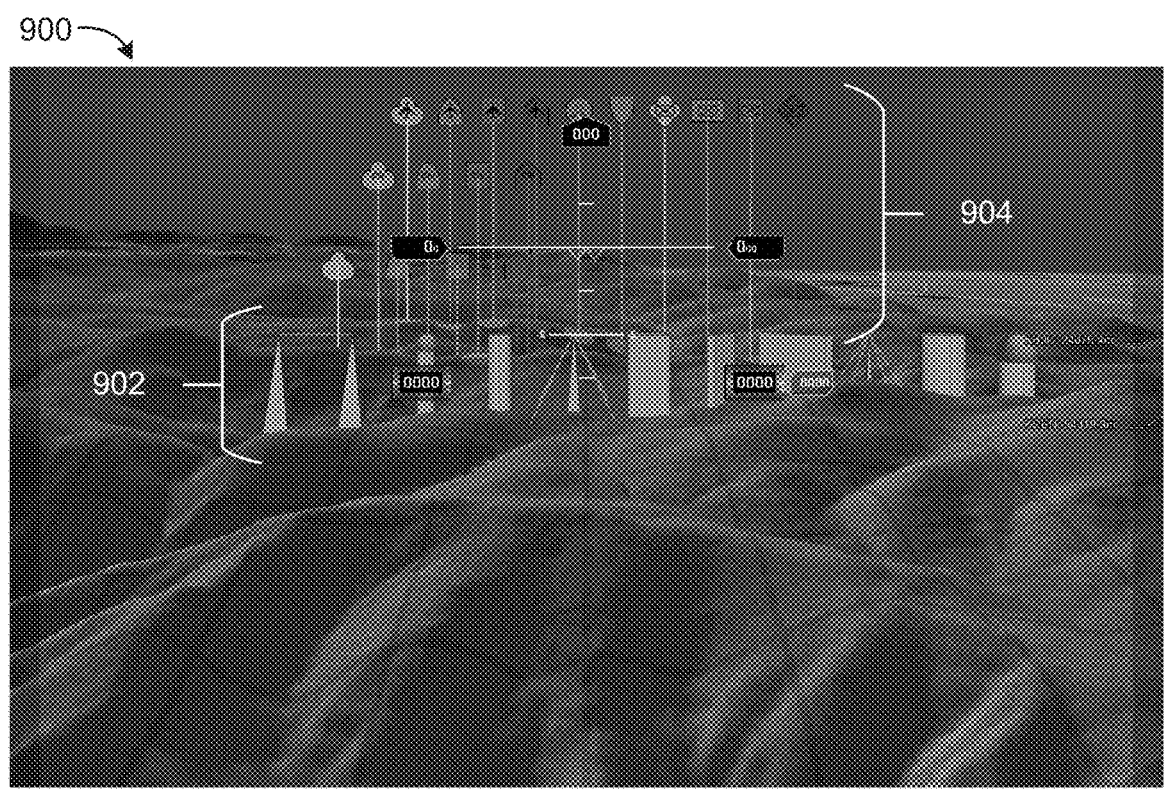
FIG. 9 is an interface generated by the PFD system of FIG. 2 with the virtual tape gauges displayed at a sixth translucency value over the background information according to exemplary aspects of the inventive concepts disclosed herein.

Referring generally to FIGS. 4-9, the gauges 402a-402h are displayed at increasing transparency values (increasingly transparent). Referring to FIG. 9, the gauges 402a-402h are fully transparent (e.g., a transparency value of 1, 100%, etc.) and only the background information is displayed. The background information includes terrain information 902 representing various buildings and/or physical structures. The structures can be military targets. Furthermore, the tactical symbols 904 are displayed and are fully visible. The tactical symbols may represent other aircraft (e.g., friendly aircraft, enemy aircraft, commercial aircraft, unidentified aircraft, friendly ground vehicles, enemy ground vehicles, etc.), engagement areas, etc. The tactical symbols 904 may be Entities of Interest (EOI) in MIL-STD-2525 symbology. In some embodiments, the tactical symbols 904 represent tracks detected by on-board sensors of the aircraft (e.g., radar systems) and/or received by the aircraft via a data link (e.g., satellite communication, very high frequency (VHF) radio communication, high frequency (HF) radio communication, etc.) from another source (e.g., a ground station, a satellite, another aircraft, a ground vehicle, etc.). In some embodiments, the display generator 208 is configured to draw the vertical lines of the tactical symbols 904 as part of the synthetic vision image in order to aid the pilot to visualize the height of the symbol above terrain and its relative position in the three dimensional scene of the interface 900 (e.g., in front of or behind terrain, obstacles, etc.). In some embodiments, the display generator 208 is configured to draw the three dimensional scene.

Figure 10:
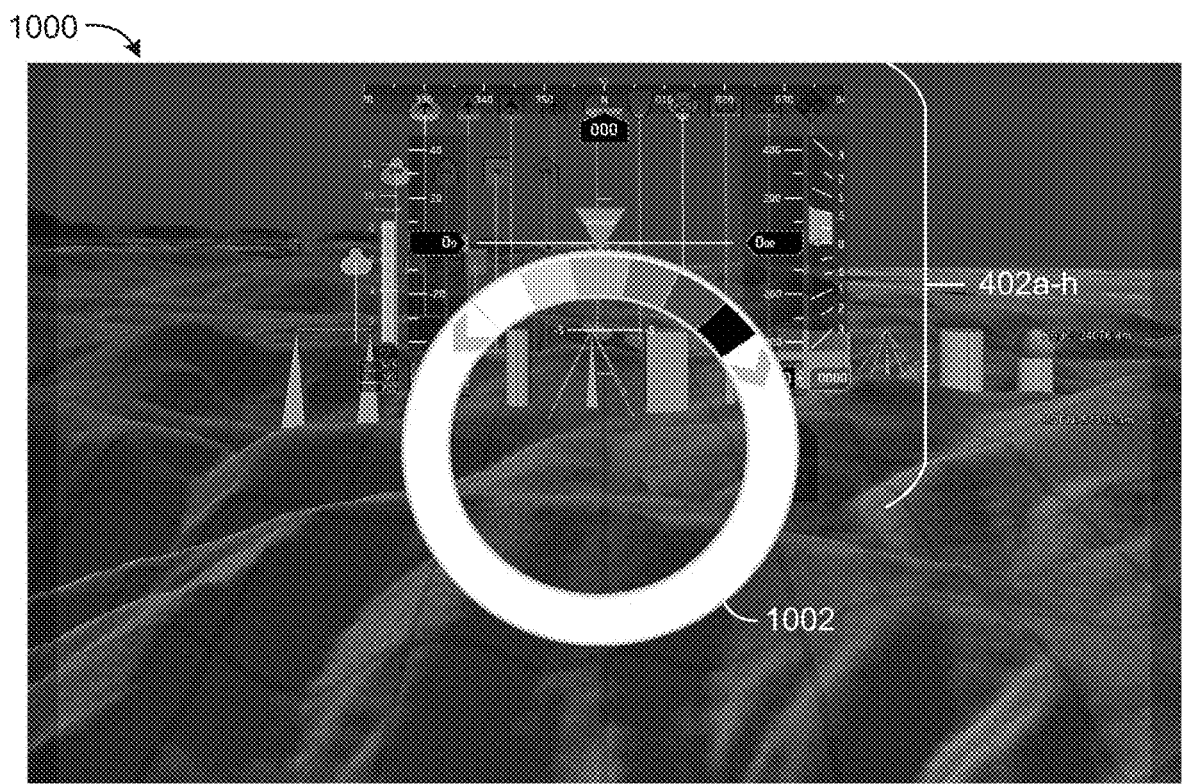
FIG. 10 is an interface generated by the PFD system of FIG. 2 with a first selection element for selecting a translucency value of the virtual tape gauges of FIGS. 4-9 according to exemplary aspects of the inventive concepts disclosed herein.

Referring now to FIG. 10, an interface 1000 including a rotational element 1002 for selecting a translucency value for the gauges 402a-402h. The rotational element 1002 can be a rotational control with a predefined number of translucency states (e.g., six translucency states). The selection element manager 212 can cause the rotational element 1002 to be displayed in response to a predefined number of touch inputs being received by the display screens 104-106. The rotational element 1002 can be displayed at any position on the interface 1000 and the position of the interface 1000 may be displayed relative to the location of the touch inputs.

The pilot, while applying the simultaneous number (e.g., three to five, or any number of simultaneous touch inputs) of touch inputs, can perform a rotation gesture (e.g., a multi-touch gesture) causing the rotational element 1002 to rotate with the gesture of the pilot. In some embodiments, the pilot can apply the touch inputs to any location of the interface 1000. However, in some embodiments, the touch inputs must be applied to a center portion of the interface 1000 to adjust the translucency value of the gauges 402a-402h. The different states of the gauge, which can be represented as white, various grey colors, and black, can represent the translucency value of the gauges 402a-402h. Each state may correspond to a discrete translucency value for the gauges 402a-402h. The state lining up with the triangular element (e.g., a blue triangular pointer which may be marked "PFD DIM") of the rotational element 1002 (which may not rotate with the rest of the rotational element 1002) may define the current state and associated translucency value for the gauges 402a-402h.

As the pilot performs a gesture to the right (clockwise) or left (counterclockwise), the gauges 402a-402h can be displayed at a corresponding translucency value (e.g., on a continuous range of values according to the amount and direction of the gesture and/or based on the state of the rotational element 1002). In this regard, the PFD system 102 can update the translucency value for the gauges 402a-402h in real-time as the input is provided to the PFD system 102 such that as the pilot provides the gesture to the interface 1000, the pilot simultaneously sees the update to translucency value for the gauges 402a-402h.

Figure 11:
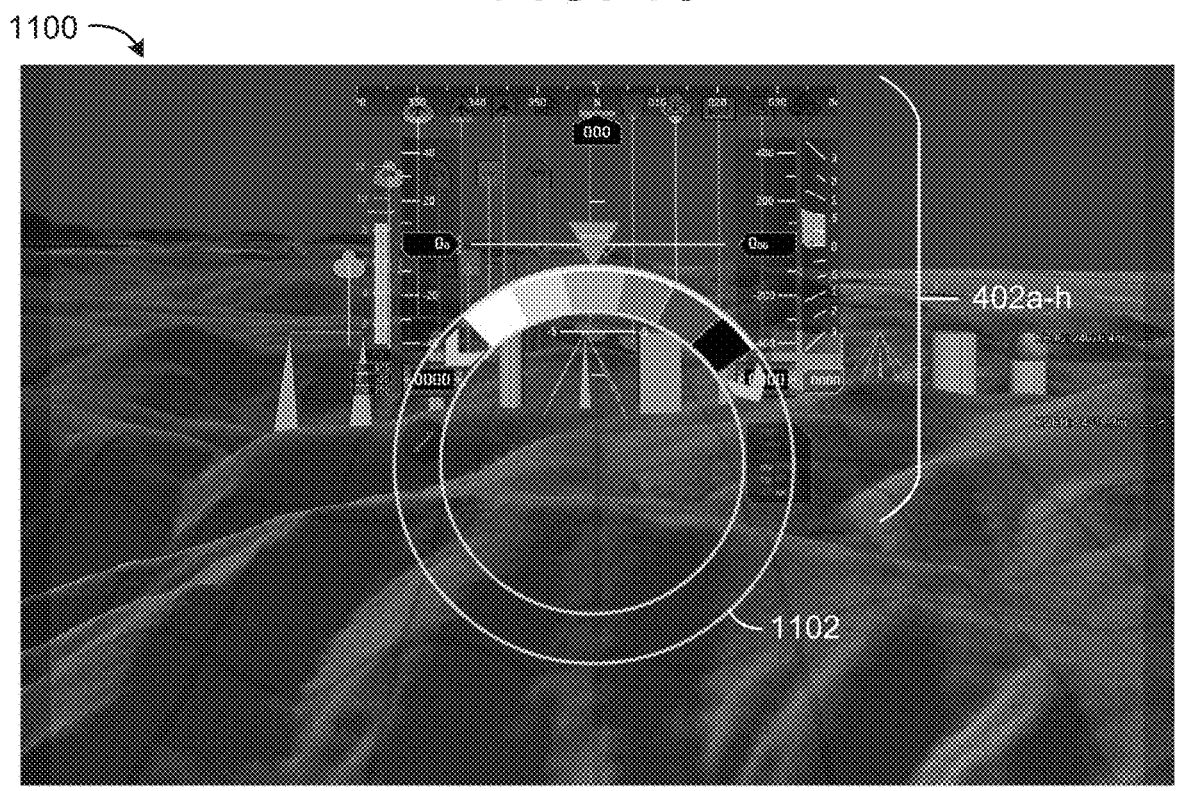
FIG. 11 is an interface generated by the PFD system of FIG. 2 with a second selection element with a transparent area for selecting the translucency value of the virtual tape gauges of FIGS. 4-9 according to exemplary aspects of the inventive concepts disclosed herein.

Referring now to FIG. 11, another rotational element 1102 of an interface 1100 is shown, according to an exemplary embodiment. The rotational element 1102 may be similar to the rotational element 1002, i.e., it may be operated in the same or a similar manner. However, the rotational element 1102 may include a transparent section different than the solid section of the element 1002. In this regard, when the rotational element 1102 is displayed over information of the interface 1100, less of the information of the interface 1100 is blocked as compared to the element 1002 over the interface 1000.

Figure 12:
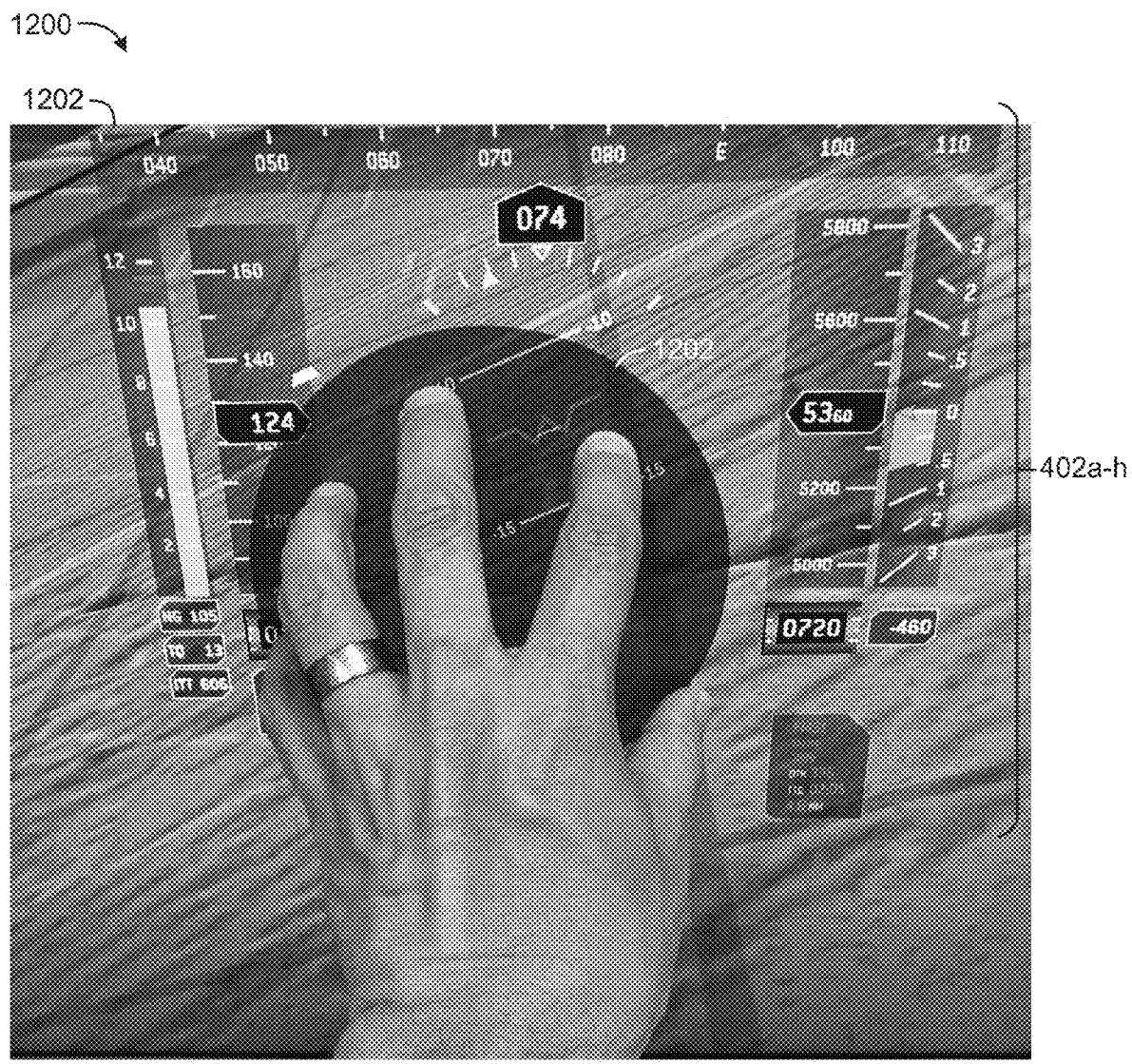
FIG. 12 is scenario where an interface generated by the PFD system of FIG. 2 includes a third selection element activated by the PFD system of FIG. 2 when a predefined number of simultaneous touches are sensed by a touchscreen of the PFD system according to exemplary aspects of the inventive concepts disclosed herein.

Referring now to FIG. 12, scenario 1200 where a pilot interacts with the interface 1202 to adjust the translucency of the gauges 402a-402h is shown, according to an exemplary embodiment. As illustrated by scenario 1200, a pilot can apply a predefined number of touches to the interface 1202, five touches to the interface 1202 in scenario 1200. The pilot can apply a right or left (clockwise or counterclockwise) rotation causing the translucency of the gauges 402a-402h or either increase (when rotating to the right) or decrease (when rotating to the left). The translucency value of the gauges 402a-402h may all correspond to the input provided by the pilot, i.e., each of gauges 402a-402h may change in unison. However, in some embodiments, the pilot may select to adjust the translucency of only a particular gauge of the gauges 402a-402h.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations.

Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A primary flight display (PFD) system for displaying flight information of an aircraft to a user, the PFD system comprising:
    a user interface configured to receive input from the user and display the flight information to the user; and
    a processing circuit configured to:
        cause the user interface to display one or more gauges indicating the flight information at a first translucency value over background information;
        receive, via the user interface, a second translucency value while the user interface displays the one or more gauges indicating the flight information at the first translucency value; and
        cause the user interface to update display of the one or more gauges indicating the flight information at the first translucency value to the second translucency value over the background information.

2. The PFD system of claim 1, wherein the one or more gauges comprise at least one of one or more vertical or horizontal flight tape gauges.

3. The PFD system of claim 1, wherein the one or more gauges are at least one of an altitude gauge displaying altitude information of the aircraft, a heading gauge indicating a direction of travel of the aircraft, an airspeed gauge indicating a first speed at which the aircraft is traveling, or a vertical speed gauge indicating a second speed at which the aircraft is changing altitude.

4. The PFD system of claim 1, wherein the first translucency value and the second translucency value are values of a predefined discrete range of translucency values.

5. The PFD system of claim 1, wherein the processing circuit is configured to:
    receive avionics data from an avionics system;
    apply one or more rules to the avionics data to determine a third translucency value; and
    cause the user interface to display the one or more gauges indicating the flight information at the third translucency value over the background information.

6. The PFD system of claim 1, wherein the user interface comprises one or more physical input components, wherein the processing circuit is configured to receive, via the user interface, the second translucency value via the one or more physical input components.

7. The PFD system of claim 1, wherein the processing circuit is configured to cause the user interface to display a selection element;

wherein the processing circuit is configured to receive, via the user interface, the second translucency value by receiving one or more interactions by the user with the selection element.

8. The PFD system of claim 7, wherein the user interface is a touchscreen interface, wherein the processing circuit is configured to cause the user interface to display the selection element in response to receiving a predefined number of simultaneous touches to the touchscreen interface.

9. The PFD system of claim 7, wherein the selection element is a circular rotational element;
wherein the one or more interactions with the selection element comprise a rotational gesture in at least one of a clockwise direction or a counterclockwise direction.

10. The PFD system of claim 9, wherein the rotational gesture in the clockwise direction causes the second translucency value to be less than the first translucency value;
wherein the rotational gesture in the counterclockwise direction causes the second translucency value to be greater than the first translucency value.

11. The PFD system of claim 9, wherein the circular rotational element comprises a plurality of translucency state indications, each of the plurality of translucency state indications associated with a particular translucency value of a discrete set of translucency values.

12. A method of adjusting a translucency of one or more gauges of a primary flight display (PFD), the method comprising:
causing, by a processing circuit, a user interface to display the one or more gauges indicating flight information of an aircraft at a first translucency value over background information;
receiving, by the processing circuit via the user interface, a second translucency value while the user interface is displaying the one or more gauges indicating the flight information at the first translucency value; and
causing, by the processing circuit, the user interface to update display of the one or more gauges indicating the flight information at the first translucency value to the second translucency value over the background information.

13. The method of claim 12, wherein the one or more gauges comprise at least one of one or more vertical or horizontal flight tape gauges.

14. The method of claim 12, wherein the one or more gauges are at least one of an altitude gauge displaying altitude information of the aircraft, a heading gauge indicating a direction of travel of the aircraft, an airspeed gauge indicating a first speed at which the aircraft is traveling, or a vertical speed gauge indicating a second speed at which the aircraft is changing altitude.

15. The method of claim 12, wherein the first translucency value and the second translucency value are values of a predefined discrete range of translucency values.

16. The method of claim 12, further comprising:
receiving, by the processing circuit, avionics data from an avionics system;
applying, by the processing circuit, one or more rules to the avionics data to determine a third translucency value; and
causing, by the processing circuit, the user interface to display the one or more gauges indicating the flight information at the third translucency value over the background information.

17. The method of claim 12, further comprising causing, by the processing circuit, the user interface to display a selection element;

wherein receiving, by the processing circuit via the user interface, the second translucency value comprises receiving, by the processing circuit, one or more interactions by a user with the selection element.

18. The method of claim 17, wherein the user interface is a touchscreen interface, wherein the processing circuit is configured to cause the user interface to display the selection element in response to receiving a predefined number of simultaneous touches to the touchscreen interface.

19. The method of claim 17, wherein the selection element is a circular rotational element;
wherein the one or more interactions with the selection element comprise a rotational gesture in at least one of a clockwise direction or a counterclockwise direction.

20. A system for displaying flight information of an aircraft to a user, the system comprising one or more memory devices configured to store instructions thereon, that, when executed by one or more processors, cause the one or more processors to:
cause a user interface to display one or more gauges indicating the flight information at a first translucency value over background information;
cause the user interface to display a selection element;
receive, via the user interface, a second translucency value while the user interface displays the one or more gauges indicating the flight information at the first translucency value by receiving one or more interactions by the user with the selection element; and
cause the user interface to update display of the one or more gauges indicating the flight information at the first translucency value to the second translucency value over the background information.

21. A primary flight display (PFD) system for displaying flight information of an aircraft to a user, the PFD system comprising:
a user interface configured to receive input from the user and display the flight information to the user; and
a processing circuit configured to:
cause the user interface to display one or more gauges indicating the flight information at a first translucency value over background information;
cause the user interface to display a selection element, wherein the selection element is a circular rotational element;
receive, via the user interface, a second translucency value by receiving one or more interactions by the user with the selection element, wherein the one or more interactions with the selection element comprise a rotational gesture in at least one of a clockwise direction or a counterclockwise direction, wherein the rotational gesture in the clockwise direction causes the second translucency value to be less than the first translucency value, wherein the rotational gesture in the counterclockwise direction causes the second translucency value to be greater than the first translucency value; and
cause the user interface to display the one or more gauges indicating the flight information at the second translucency value over the background information.

22. A primary flight display (PFD) system for displaying flight information of an aircraft to a user, the PFD system comprising:
a user interface configured to receive input from the user and display the flight information to the user; and a processing circuit configured to:
   cause the user interface to display one or more gauges indicating the flight information at a first translucency value over background information;
   cause the user interface to display a selection element, wherein the selection element is a circular rotational element, wherein the circular rotational element comprises a plurality of translucency state indications, each of the plurality of translucency state indications associated with a particular translucency value of a discrete set of translucency values;
   receive, via the user interface, a second translucency value by receiving one or more interactions by the user with the selection element, wherein the one or more interactions with the selection element comprise a rotational gesture in at least one of a clockwise direction or a counterclockwise direction; and
   cause the user interface to display the one or more gauges indicating the flight information at the second translucency value over the background information.

* * * * *